(12) United States Patent
Khan et al.

(10) Patent No.: US 9,215,313 B2
(45) Date of Patent: Dec. 15, 2015

(54) ADMISSION CONTROL OF A COMMUNICATION SYSTEM

(71) Applicant: Comcast Cable Communications, LLC, Philadelphia, PA (US)

(72) Inventors: Sohel Khan, Philadelphia, PA (US); Jon Allen Boone, Coatesville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/540,652

(22) Filed: Nov. 13, 2014

(65) Prior Publication Data

US 2015/0131790 A1    May 14, 2015

Related U.S. Application Data

(63) Continuation of application No. 13/834,452, filed on Mar. 15, 2013, now Pat. No. 8,923,496.

(51) Int. Cl.
*H04M 3/00* (2006.01)
*H04M 3/38* (2006.01)
*H04M 3/436* (2006.01)

(52) U.S. Cl.
CPC ............... *H04M 3/38* (2013.01); *H04M 3/436* (2013.01)

(58) Field of Classification Search
USPC ............................... 379/189, 201.07, 201.08
See application file for complete search history.

(56) References Cited

U.S. PATENT DOCUMENTS 6,823,392 B2 * 11/2004 Cherkasova et al. ........... 709/229
2008/0159500 A1 * 7/2008 Wang ........................ 379/142.05

* cited by examiner

*Primary Examiner* — Quynh Nguyen
(74) *Attorney, Agent, or Firm* — Ballard Spahr LLP

(57) ABSTRACT

Aspects of the disclosure relate to admission control of a communication session in a network. The admission control can be implemented by a network node at the boundary of the network or a subsystem thereof. In one aspect, the admission control can be implemented during a predetermined period and can be based at least on an admission criterion, which can be specific to an end-point device, e.g., a target device or an origination device. The admission criterion can be configurable and, in certain implementations, it can be obtained from historical performance associated with establishment of communication session. Such historical performance can be assessed within a period of a configurable span.

20 Claims, 8 Drawing Sheets

ADMISSION CONTROL OF A COMMUNICATION SYSTEM

CROSS REFERENCE TO RELATED APPLICATION

This application is a Continuation of U.S. Non-Provisional application Ser. No. 13/834,452 filed Mar. 15, 2013, herein incorporated by reference in its entirety.

BACKGROUND

Establishment of a communication session (e.g., an interactive multimedia session) generally entails allocation of network resources (e.g., bandwidth, communication channels (such as signaling channels), PDPs, processing resources, and the like), regardless of the communication session being established successfully or failing to initiate. Such allocation can block network resources and can incur processing that can create network congestion, particularly in scenarios in which the communication session is an automated voice session.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following extensive, more detailed description.

One or more embodiments of the disclosure relate to admission control of a communication session (or sessions). The admission control can be implemented by a network node at the boundary of the network or a subsystem thereof. In one aspect, the admission control can be implemented during a predetermined period and can be based at least on an admission criterion, which can be specific to an end-point device, e.g., a target device or an origination device. The admission criterion can be configurable and, in certain implementations, it can be obtained from historical performance associated with establishment of communication sessions. Such historical performance can be assessed within a period of a configurable span. The methods and systems can comprise initiating, at a first network node, a communication session associated with a target device, determining, at the first network node, if a record is cached that is indicative of one or more of the originating device or a user associated with the originating device, and processing, by the first network node, the communication session based at least on a predetermined session admission metric in response to the record being determined to be cached.

In an aspect, admission control methods and systems can be implemented to manage automated communications, also referred to as automated calls ("robocalis"), and the like. There are many types of automated communications, with some automated communications desired more than others. The methods and systems can utilize a registry of numbers associated with communication systems that perform automated communications to govern whether or not to complete a communication session. The methods and systems can comprise receiving a communication request for a destination call number from an incoming call number, determining whether the incoming call number is present in a registry, processing the communication request based on the determination of whether the incoming call number is present in the registry, determining whether the destination call number is valid, and updating the registry based on destination call number validity. The communication request can comprise an automated communication.

Additional aspects or advantages of the disclosure will be set forth in part in the description which follows, and in part will be apparent from the description, or may be learned by practice of the subject disclosure. The advantages of the subject disclosure will be realized and attained by means of the elements and combinations particularly pointed out in the appende claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure:

DETAILED DESCRIPTION

Figure 1:
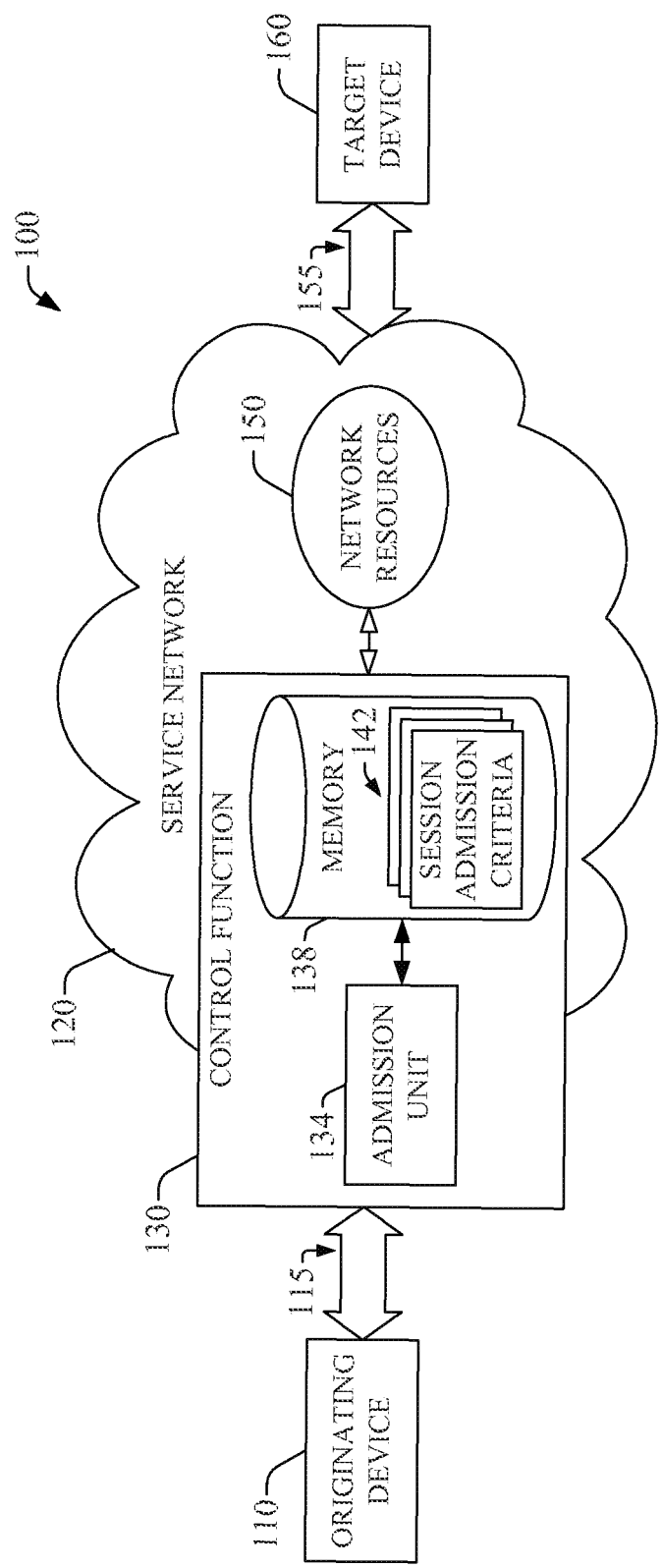
FIG. 1 is a block diagram that illustrates an example network environment in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for admission control of a communication session in a network. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "component," "unit," "interface," "platform," "node," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements," As an example, a unit can be, but is not limited to being, a process finning on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function" can be utilized interchangeably.

Throughout the description and claims of this specification, the words "comprise" and "having" and their variations, such as "comprising" and "comprises," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

In view of the various aspects of processing a request for an asset in a network, such as those described herein, exemplary methods that can be implemented in accordance with the disclosure can be better appreciated with reference to the figures and associated descriptions. For simplicity of explanation, the exemplary methods disclosed herein are presented and described as a series of actions (also referred to as steps), pictorially represented with a block or as a delivered or received message in a call flow. However, it is to be understood and appreciated that implementation, and related advantages, of such methods is not limited by the order of actions, as some actions may occur in different orders and/or concurrently with other actions from that shown and described herein. For example, the various methods (also referred to as processes) of the subject disclosure can alternatively be represented as a series of interrelated states or events, such as in a state diagram. Moreover, when disparate functional elements (network nodes, units, etc.) implement disparate portions of the methods of the subject disclosure, an interaction diagram or a call flow can represent such methods or processes. Furthermore, not all illustrated actions or messages may be required to implement a method in accordance with the subject disclosure.

The methods disclosed throughout the subject specification can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosure identifies and addresses, in one aspect, the issue of errors in servicing of communication sessions in a network. Such errors can range from failure to establish a communication session (e.g., faulty connectivity, etc.) to resource blockade, in which network resources available for communication are allocated without establishment of the communication session. As described in greater detail below, the disclosure relates to admission control of a communication session in a network. In certain embodiments, the admission control can be implemented by a network node at the boundary of the network or a subsystem thereof. In one aspect, the admission control can be implemented during a predetermined period and can be based at least on an admission criterion, which can be specific to an end-point device, e.g., a target device or an origination device. The admission criterion can be configurable and, in certain implementations, it can be obtained from historical performance associated with establishment of communication session. Such historical performance can be assessed within a sliding period of a configurable span. Certain functional elements of the disclosure can be implemented (e.g., performed) by software, hardware, or a combination of software and hardware. Functional elements of the various embodiment(s) described in the present specification and illustrated in the annexed drawings can be employed in operational environments (access network, telecommunication network, signaling network, etc.) that can include, for example, digital equipment, analog equipment, or both, wired or wireless equipment, etc.

In an aspect, provided are methods and systems thr handling automated phone calls, referred to as "robocalls." An automated communication can utilize a computerized auto-dialer to deliver a pre-recorded message. Automated communications are often associated with political and telemarketing phone campaigns, but can also be used for public-service or emergency announcements. Some automated communications use personalized audio messages to simulate an actual personal phone call. Overuse of automated communications can overload network systems and harass the public. However, automated communications can provide a benefit to the public by providing an efficient means for communicating relevant information. The methods and systems provided can ensure the benefits of automated communications are realized, while minimizing the negative effects.

Accordingly, the methods and systems provided can establish a registry of unique identifiers associated with automated communications. In an aspect, the registry can be an OID (Origination identity) Registry, for example. By way of example, an OID can be an address of record, a calling number, call party number, origination address, origination phone number, origination SIP URI or Tel URI, Fully Qualified Domain Name (fqdn), email address, IP address, and the like. The OID Registry can comprise Automatic Number Identification (ANI) functionality. The OID Registry can comprise phone numbers responsible for originating one or more automated communications. An automated communication provider can register one or more phone numbers with the OID Registry to ensure delivery of the automated communication. In an aspect, the OID Registry can associate a threshold number of calls with one or more phone numbers originating automated communications. For example, an originating phone number can have 1,000 calls associated with it. In an aspect, an originating phone number can have a threshold number of failed calls, after which any additional calls from the originating phone number can be rejected (permanently or temporarily). The methods and systems can then utilize that information when determining whether to process or reject an OID registered automated communication. In an aspect, a fee structure can be established whereby automated communication providers pay to register a phone number and/or for establishing a threshold number of calls.

Referring to the drawings, FIG. 1 illustrates a high-level block diagram of an exemplary network environment 100 in accordance with one or more aspects of the disclosure. As illustrated, the exemplary network environment 100 comprises an originating device 110 functionally coupled (e.g., communicatively coupled via wired links or wireless links, or a combination thereof) to a service network 120 which can include wireless networks, wireline networks, and any combination thereof. A data and signaling pipe 115 comprising an upstream link, or uplink (UL), and a downstream link, or downlink (DL), enables functional coupling among the originating device 110 and the network 120. The data and signaling pipe 115 can comprise a wireless link or wireline link, or a combination thereof. Device 110 can be embodied in or can comprise end-user equipment, such as a user device (mobile or otherwise) or most any customer premises equipment. Accordingly, originating device 110 can be an electronic device that is part of a network (e.g., a telecommunication network, a home network, a utilities network, or combinations thereof) and has various levels of computational capability. For example, the device 110 can be at least one of a terminal display device, a set top box (STB), internet protocol (IP)-enabled television, a personal computer, a portable computer, a telephone, a wearable computer, and so forth. The originating device 110 can comprise an identifier (e.g., a metadata field, a hypermedia (ink, etc.) that identifies the device 110. The originating device 110 can comprise a unique number (e.g., phone number) that can be detected by an OID system. This unique number is referred to herein as an incoming call number.

In addition, the example network environment 100 also includes a target device 160 functionally coupled to the service network 120 via a data and signaling pipe 155, which can comprise a wireless link or wireline link, or a combination thereof. The target device 160 can comprise an identifier (e.g., a metadata field, a hypermedia link, etc.) that identifies the device 110. The target device 160 can comprise a unique number e.g., phone number), referred to herein as a destination call number.

In one aspect, the originating device 110 can transmit a session initiation request to communicate with target device 160. To initiate and/or support a communication session, the originating device 110 and the target device 160 can exploit the network 120, with which the originating device 110 can communicate in accordance with various packet-switched (PS) communication protocols supported by such network. Similarly, the target device 160 also can communicate with the network 120 in accordance with various PS communication protocols. For instance, the various packet-switched communication protocols can include one or more of an Ethernet protocol format; an internet protocol (IP) format, such as IPv4 and IPv6, or the like; a user datagram protocol (UDP) format; HTTP; simple object access protocol (SOAP); simple network management protocol (SNMP); SIP; or H.323 protocol.

It should be appreciated that in certain embodiments one or more of the originating device 110 or the target device 160 can communicate (e.g., exchange information) with the network 120 according to non-PS communication protocols. For instance, the target device can be a POTS device, which can communicate with the service network 120 via a circuit-switched (CS) communication protocol.

The service network 120 can include wireless networks, wireline networks, and any combination thereof, which can permit establishment (e.g., initiation, maintenance, initiation and maintenance, etc.) of a communication session. In one aspect, the service network 120 can include one or more of wide area networks (WANs), one or more local area networks (LANs), Voice over IP (VoIP) networks, signaling networks (e.g., SS#7), real-time video over IP network, real-time multimedia network, and the like. Such networks can operate in accordance with most any communication protocol for wireline communication or wireless communication. In certain embodiments, network 120 can have several functional elements that can provide a backbone network, such as a high-capacity packet-switched network. In other embodiments, network 120 can have internal structure, with several functional elements that can provide at least two main operational blocks: a backbone network (e.g., a high-capacity packet-switched network) and a regional access network (RAN). The internal structure also can include functional elements that provide more spatially localized networks, such as local area networks, home area networks, or the like. Both the backbone network and the regional access network (RAN) can be WANs, for example, with the backbone network having a larger geographical scope than the RAN.

In one aspect, the origination device 110 can transmit a session initiation message (e.g., a VoIP session initiation message) to the control function 130 (e.g., a session boundary control (SBC) function or SBC) in order to initiate a communication session with the target device 160. The session initiation message can convey information (e.g., data and/or metadata) that identifies the originating device 110 and/or the target device 160. The control function 130 can regulate allocation of network resources 150 that can be dedicated for such communication session. The network resources 150 can comprise one or more of bandwidth, communication channels (such as signaling channels), PDPs, processing resources, or the like. As illustrated, the control unit 130 can comprise an admission unit 134 functionally coupled to a memory 138. The admission unit 134 can receive the session initiation message and can determine if a record indicative of the originating device 110 (or a user associated with the originating device 110) is available in the memory 138, for example, in an admission control cache (e.g., OID Registry). The admission unit 134 can also receive the session initiation message and can determine if a record indicative of the target device 160 (or a user associated with the target device 160) is available in the memory 138, for example, in an admission control cache (e.g., Do Not Call registry). In a scenario in which such a record indicative of one or both of the originating device 110 and/or the target device 160 (or respective associated users) is available in the admission control cache—e.g., the record is cached—the admission unit 134 can apply at least one session admission criterion in order to permit or reject processing of the communication session. The at least one session admission criterion can be retained in one or more memory elements 142, labeled as session admission criteria. In one aspect, the session admission criteria can include a session admission metric that can be determined based at least on historical performance associated with establishment of a communication session (i) between the originating device 110 and the target device 160, (ii) with the target device 160, or (iii) from the originating device. In one embodiment, the session admission metric can be a success-to-failure ratio for several communication sessions directed to or from the target device 160. In a scenario in which application of the at least one session admission criteria indicates that the processing of the communication session can proceed, the control unit 130 can broker establishment of the communication session.

Figure 2:
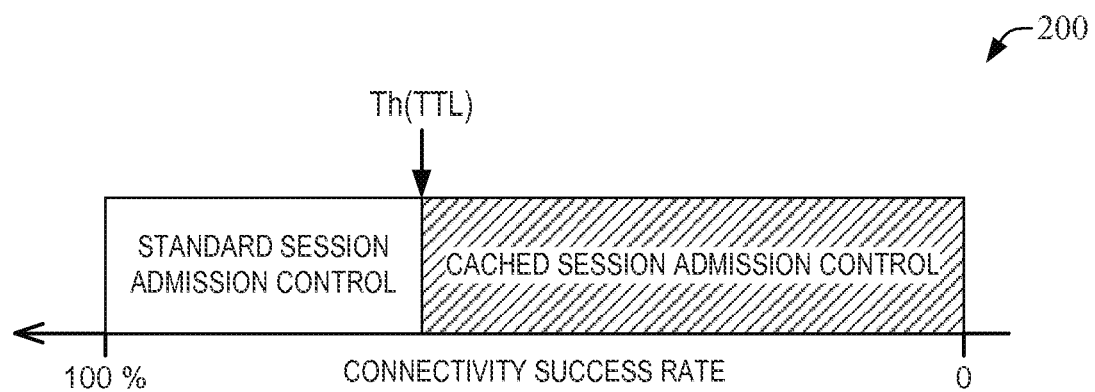
FIG. 2 is a diagram that illustrates two example regimes of session admission control in in accordance with one or more aspects of the disclosure.
Figure 3:
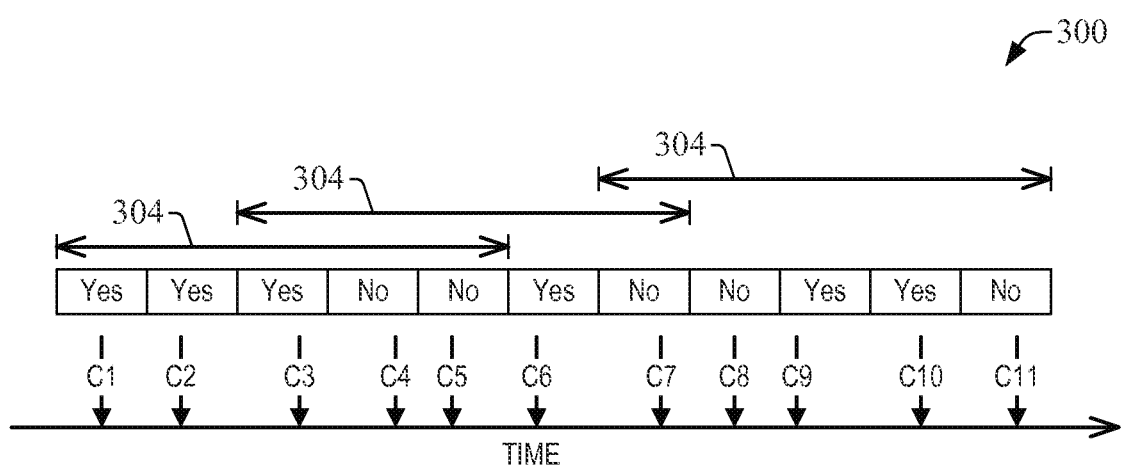
FIG. 3 is a diagram that illustrates generation of an admission control metric in accordance with one or more aspects of the disclosure.

As illustrated in FIG. 2, the control function 130 can utilize cached session admission control in which performance of the service network is below certain threshold (Th(TTL)), which can be specific to a predetermined, configurable admission control period time to live (TTL) in connection with a session admission metric, as illustrated in FIG. 3, such metric can be determined based on historical performance of a group of communication sessions (e.g., VoIP calls, illustrated with the letter C and a cardinal number in FIG. 3). As described herein, the performance period can be a sliding time interval 304 comprising the group of communication sessions (e.g., a group of about 5 VoIP calls).

Figure 4:
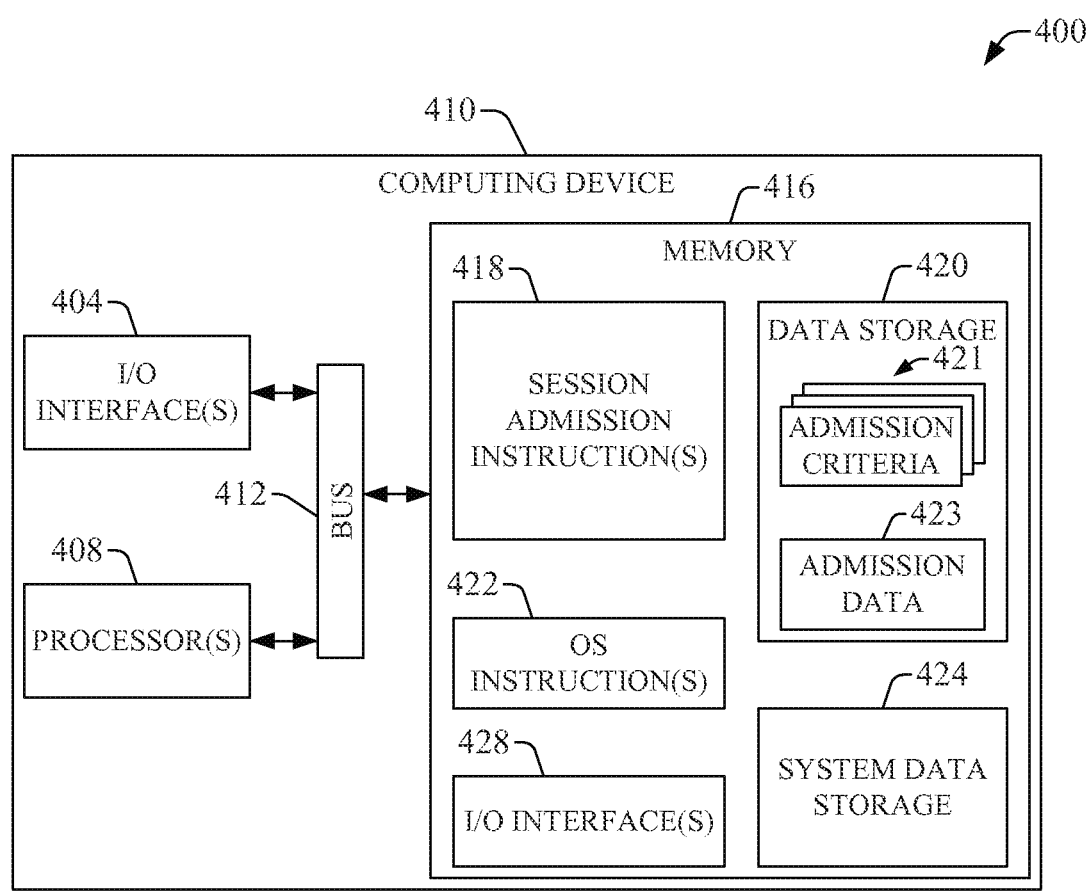
FIG. 4 is a block diagram that illustrates an example embodiment of a computing device in accordance with one or more aspects of the disclosure.

FIG. 4 is a block diagram of an example embodiment 400 of a computing device 410 that can implement admission control of a communication session in accordance with one or more aspects of the disclosure. The computing device 410 can embody or can comprise the control function 130. In the illustrated embodiment, the computing device 410 can comprise a memory 416 having computer-accessible instructions, e.g., computer-readable and/or computer-executable instructions, encoded thereon. At least a portion of such instructions can be retained as session admission instruction(s) in a memory, element 416 (which is referred to as session admission instruction(s) 418). In addition, the computing device 410 can comprise a processor (e.g., one of processor(s) 408) functionally coupled to the memory, 416 and configured, by the computer-executable instructions. The processor also can be configured to generate a request for a data object, the request comprising an identifier indicative of a first value, and a second value, and to transmit the request for the data object to a first network node, wherein the first network node is configured to validate the request and, in response to the request being valid, transmit the request to a second network node. The first value and the second value can be a first set of values and/or a second set of values, respectively.

To generate the request for the data object, the processor can be configured to format the request according to a specific communication protocol, the data object being a media content fragment. In one aspect, the specific communication protocol can be a web-based communication protocol comprising at least one of hypertext transfer protocol (HTTP), simple object access protocol (SOAP), or simple network management protocol (SNMP).

As illustrated, in the exemplary embodiment 400, the computing device 410 comprises a group of one or more I/O interfaces 404, a group of one or more processors 408, a memory 416, and a bus 412 that functionally couples various functional elements of the computing device 410, including the group of one or more processors 408, to the memory 416. In scenarios in which operation of the computing device 410 can be critical to network performance, such as in guaranteed service quality scenarios, the group of one or more processors 408 can comprise a plurality of processors that can exploit concurrent computing.

The functionality of the computing device 410 can be configured by a group of computer-executable instructions (e.g., programming code instructions or programming modules) that can be executed by a processor of the one or more processors 408. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the processor.

Data and computer-accessible instructions, e.g., computer-readable instructions and computer-executable instructions, associated with specific functionality of the computing device 410 can be retained in memory 416. Such data and instructions can permit implementation, at least in part, of the validation of a request for an asset (e.g., a data object) based on information in the request in accordance with aspects described herein. In one aspect, the computer-accessible instructions can embody any number of programming code instructions or program modules that permit specific functionality. In the subject specification and annexed drawings, memory elements are illustrated as discrete blocks; however, such memory elements and related computer-accessible instructions, e.g., computer-readable and computer-executable instructions, and data can reside at various times in different storage elements (registers, files, memory addresses, etc.; not shown) in memory 416.

Data storage 420 can comprise a variety of data, metadata, or both associated with request of objects (e.g., fragments) in accordance with aspects described herein. Memory 416 also can comprise one or more computer-executable instructions for implementation of specific functionality of the computing device 410 in connection with requesting an object in accordance with aspects described herein. Such computer-executable instructions can be retained as a memory element labeled session admission instruction(s) 418. In one aspect, as described herein, the session admission instruction(s) 418 can be stored as an implementation (e.g., a compiled instance) of one or more computer-executable instructions that implement and thus provide at least the functionality of the methods described in the disclosure. The session admission instruction (s) 418 also can be transmitted across some form of computer readable media. It should be appreciate that different request composition instruction(s) can render physically alike devices into functionally different components, with functional differences dictated by logic (e.g., computer-executable instructions and data) specific to each one of such network nodes and defined by the session admission instruction (s) 418.

Memory 416 can be embodied in a variety of computer-readable media. Exemplary computer-readable media can be any available media that is accessible by a processor in a computing device, such as one processor of the group of one or more processors 408, and comprises, for example, both volatile and non-volatile media, removable and non-removable media. As an example, computer-readable media can comprise computer storage media, or computer-readable storage media, and communications media. Such storage media can be non-transitory storage media. "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be utilized to store the desired information and which can be accessed by a computer or a processor therein or functionally coupled thereto.

Memory 416 can comprise non-transitory computer-readable storage media in the form of volatile memory, such as RAM, EEPROM, and the like, or non-volatile memory such as ROM. In one aspect, memory 416 can be partitioned into a system memory (not shown) that can contain data and/or programming modules that enable essential operation and control of the computing device 410. Such program modules can be implemented (e.g., compiled and stored) in memory element 416, referred to as OS instruction(s) 422, whereas such data can be system data that is retained in memory element 424, referred to as system data storage 424. The OS instruction(s) 422 and system data storage 424 can be immediately accessible to and/or are presently operated on by at least one processor of the group of one or more processors 408. The OS instruction(s) 422 can embody an operating system for the computing device 410. Specific implementation of such OS can depend in part on architectural complexity of the computing device 410. Higher complexity affords higher-level OSs. Example operating systems can include Unix, Linux, iOS, Windows operating system, and substantially any operating system for a computing device.

Memory 416 can comprise other removable/non-removable, volatile/non-volatile computer-readable non-transitory storage media. As an example, memory 416 can include a mass storage unit (not shown) which can provide non-volatile storage of computer code, computer readable instructions, data structures, program modules, and other data for the computing device 410. A specific implementation of such mass storage unit (not shown) can depend on the desired form factor of, and space available for, deployment of the computing device 410. For suitable form factors and sizes of the monitoring device, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

Features of validation of a request for an asset (e.g., a data object) based on information in the request in accordance with aspects described herein can be performed, at least in part, in response to execution of software components (e.g., one or more implementations of session admission instruction(s) 418 by a processor. In particular, yet not exclusively, to provide the specific functionality of the computing device 410, a processor of the group of one or more processors 408 in the computing device 410 can execute at least a portion of the session admission instruction(s) 418.

In general, a processor of the group of one or more processors 408 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 408 can refer to an integrated circuit with dedicated functionality, such as an ASIC, DSP, a FPGA, a CPLD, a discrete gate or transistor logic, discrete hardware components, or any combination thereof designed to perform the functions described herein. In one aspect, processors referred to herein can exploit nanoscale architectures, such as, molecular and quantum-dot based transistors, switches and gates, in order to optimize space usage (e.g., improve form factor) or enhance performance of the computing devices that can implement the various aspects of the disclosure. In another aspect, the one or more processors 308 can be implemented as a combination of computing processing units.

The one or more input/output (I/O) interfaces 404 can functionally couple (e.g., communicatively couple) the computing device 410 to another functional element (component, unit, server, gateway node, repository, etc.) of network 120, for example. The functionality of the computing device 410 that is associated with data I/O or signaling I/O can be accomplished in response to execution, by a processor of the group of one or more processors 408, of at least one I/O interface retained in memory element 428. In some embodiments, the at least one I/O interface embodies an API that permits exchange of data or signaling, or both, via an I/O interface of I/O interface(s) 404. In certain embodiments, the one or more I/O interfaces 404 can include at least one port that can permit connection of the computing device 410 to other functional elements of the exemplary network environment 100. In one or more scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 404 can enable delivery of output (e.g., output data, output signaling) to such functional element. Such output can represent an outcome or a specific action of one or more actions described herein, such as action(s) in exemplary methods discussed in relation to FIGS. 5-7.

Bus 412 represents one or more of several types of bus structures, including a memory bus or memory controller, a peripheral bus, an accelerated graphics port, and a processor or local bus using any of a variety of bus architectures. As an example, such architectures can comprise an ISA bus, an MCA bus, an EISA bus, a VESA local bus, an AGP bus, and a PCI, a PCI-Express bus, a PCMCIA bus, a USB bus, or the like.

Figure 5A:
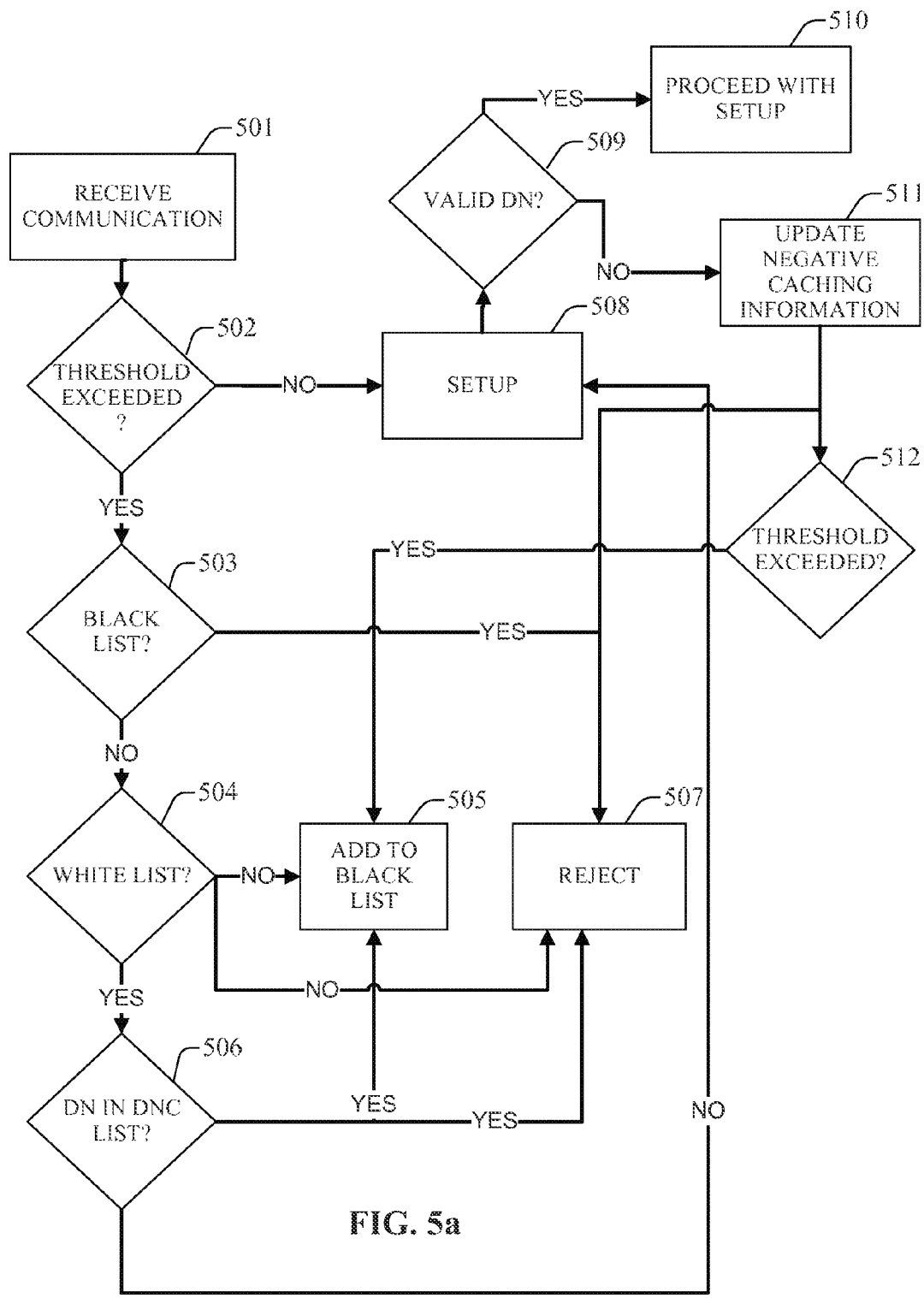
FIG. 5a is a flow chart that illustrates an exemplary method in accordance with one or more aspects of the disclosure.

FIG. 5a illustrates an exemplary method in the context of a phone call as an example communication session, however, all types of communication sessions are contemplated. At step 501, an incoming call can be received, wherein the incoming call is from an incoming call number (e.g., calling party phone number) and is intended for a call destination number (e.g., recipient phone number). In an aspect, the call can be received at a call admission controller. The call admission controller can determine whether or not the received call exceeds network operational capacity. The call admission controller can reject one or more incoming calls in the event network operational capacity will not support an additional call. The incoming call can be an unregistered automated communication, a registered automated communication, or a non-automated communication. In an aspect, it can be determined whether the incoming call number is present in an OID Registry. For example, if the incoming call number is not present in the OID Registry, the call (e.g., unregistered automated communication or non-automated communication) can be setup without further processing. If the incoming call number is present in the OID Registry then the call can be identified as a registered automated communication.

Figure 5B:
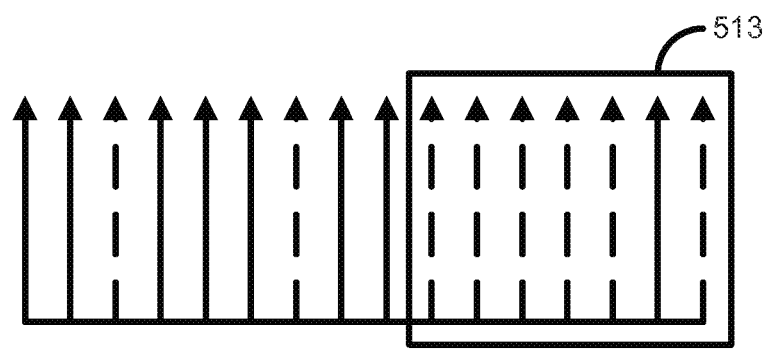
FIG. 5b illustrates a number of calls from the same OID.

At block 502, a determination can be made as to whether a call number threshold has been exceeded for the incoming call number. The call number threshold can represent a. number of calls, a number of failed calls, or a combination thereof. If the call number threshold has not been exceeded, the call can proceed to be setup at block 508. FIG. 5b illustrates a number of calls from the same OID. Solid arrows represent successful calls and dashed arrows represent calls that fail. Once a threshold number of failed calls has been exceeded, further calls from that OID can be rejected, either permanently or temporarily. The calls indicated in box 513 represent rejected calls based on the OID exceeding a threshold number of failed calls. Returning to FIG. 5a, if the threshold has been exceeded the method can proceed to block 503. In an aspect, if the call number threshold has been exceeded, a notification can be sent to the automated communication provider and/or other peer providers.

At 503, a determination can be made as to whether the incoming call number is present in an OID Black List. The Black List can comprise origination call numbers that were previously detected as originating illegitimate automated communication and/or large numbers of calls to invalid destination numbers. If the incoming call number is present on the Black List, the call can be rejected at block 507.

If the incoming call number is not present in the OID Black List, the method can proceed to block 504 to determine whether the incoming call number is present on an OID White List. The White List can comprise call numbers that that are known to originate legitimate automated communication, such as an automated communication to valid call destination numbers. If the incoming call number is not present on the White List, the incoming call can be rejected at block 507 and the incoming call number can be added to the Black List at block 505. If the incoming call number is present on the White List, a determination can be made at block 506 as to whether the call destination number is present in a Do Not Call List. A Do Not Call List can comprise a list of call destination numbers that should not receive an automated communication. If the call destination number is present in a Do Not Call List, the call can be rejected at block 507 and the incoming call number can be added to the Black List at block 505. If the call destination number is not present in a Do Not Call List, the call can be setup at block 508.

At block 509, after the call has been setup, a determination can be made as to whether the call destination number is valid or invalid. If call set up requests to a destination yields successful responses within a configurable number of setup trials within a certain configurable setup time threshold, the destination number can be considered valid. The number of setup trials and setup threshold can be Obtained through statistical regression thorough machine learning. If the call destination number is valid, call setup can proceed at block 510. If call set up requests to a destination yields unsuccessful or progress responses beyond a configurable number of setup trials within a certain time configurable set-up time threshold, the destination number can be considered not valid. The number of setup trials and setup threshold can be obtained through statistical regression thorough machine learning. If the call destination number is not valid, the call proceeds to 511 to update the OID of the call in the negatively cached memory, in 511 and the call is rejected at 507. In addition, event notifications related to a negative cached OID can be received. The statistical pattern of the call rejection of the OID can be analyzed to determine the ratio of the failed vs. successful calls to various destinations from this OID. The ratio can be compared with a configurable threshold at block 512. The configurable threshold can determine whether an OID should be added temporarily to the Black List. If the ratio is less than the configurable threshold, the OID is added in the OID Black List in block 505 temporarily. At block 512, negative caching information can be provided to a negative caching algorithm. The negative caching algorithm can process the negative caching information to add the incoming call number to the Black List at block 505, In an aspect, the incoming call number can be added to the Black List temporarily, for example, for a configurable period of time such as 15 minutes, 6 hours, or one day, or the like. In a further aspect, a predetermined threshold of invalid call destination numbers can be established. The predetermined threshold of invalid call destination numbers can comprise a rate or a number of calls. For example, the predetermined threshold of invalid call destination numbers can comprise 100; 500; 1,000; and the like. If the predetermined threshold of invalid call destination numbers is exceeded, the incoming call number can be added to the Black List, either permanently or temporarily.

Figure 6:
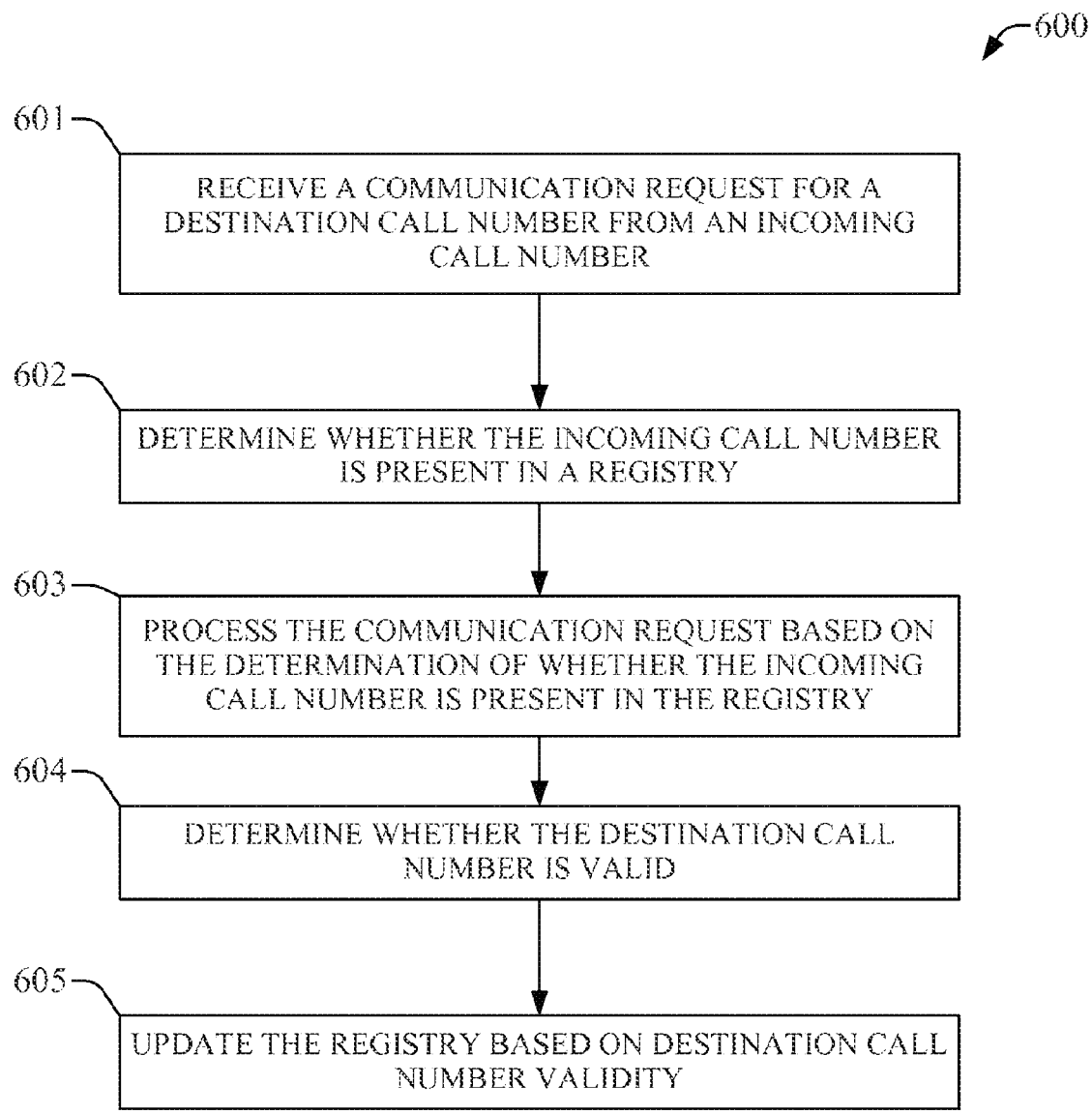
FIG. 6 is a flow chart that illustrates another exemplary method in accordance with one or more aspects of the disclosure.

In an aspect, illustrated in FIG. 6, provided are methods 600 comprising receiving a communication request for a destination call number from an incoming call number at 601, determining whether the incoming call number is present in a registry at 602, processing the communication request based on the determination of whether the incoming call number is present in the registry at 603, determining whether the destination call number is valid at 604, and updating the registry based on destination call number validity at 605. The communication request can comprise an automated communication. The registry can comprise one or more lists, for example, a first list and a second list. The first list can be a Black List and the second list can be a White List.

In an aspect, processing the communication request based on the determination of whether the incoming call number is present in the registry can comprise determining a threshold associated with the incoming call number if the incoming call number is present in the registry. The threshold can be a predetermined number of calls and/or a predetermined rate of calls. Processing the communication request based on the determination of whether the incoming call number is present in the registry can comprise determining whether the incoming call number is present in the first list or the second list, if the threshold has been exceeded.

In one aspect, if the incoming call number is present in the first list, the communication request can be denied. If the incoming call number is not present in the first list and is not present in the second list, the communication request can be denied and the incoming call number can be added to the first list. If the incoming call number is not present in the first list and is present in the second list, a determination can be made as to whether the destination call number is present in a restricted destination list. If the destination call number is present in a restricted destination list, the communication request can be denied.

In an aspect, updating the registry based on destination call number validity can comprise adding the incoming call number to the first list if the destination call number is invalid. A party responsible for the incoming call number can be notified that the incoming call number has been added to one or more lists.

Updating the registry based on destination call number validity can comprise updating negative caching information if the destination call number is not valid. If the destination call number is valid, a communication session can be established, such as a call setup. In an aspect, a ratio of failed versus successful calls from the incoming call number can be determined. If the ratio exceeds a threshold, the incoming call number can be added to the first list.

Figure 7:
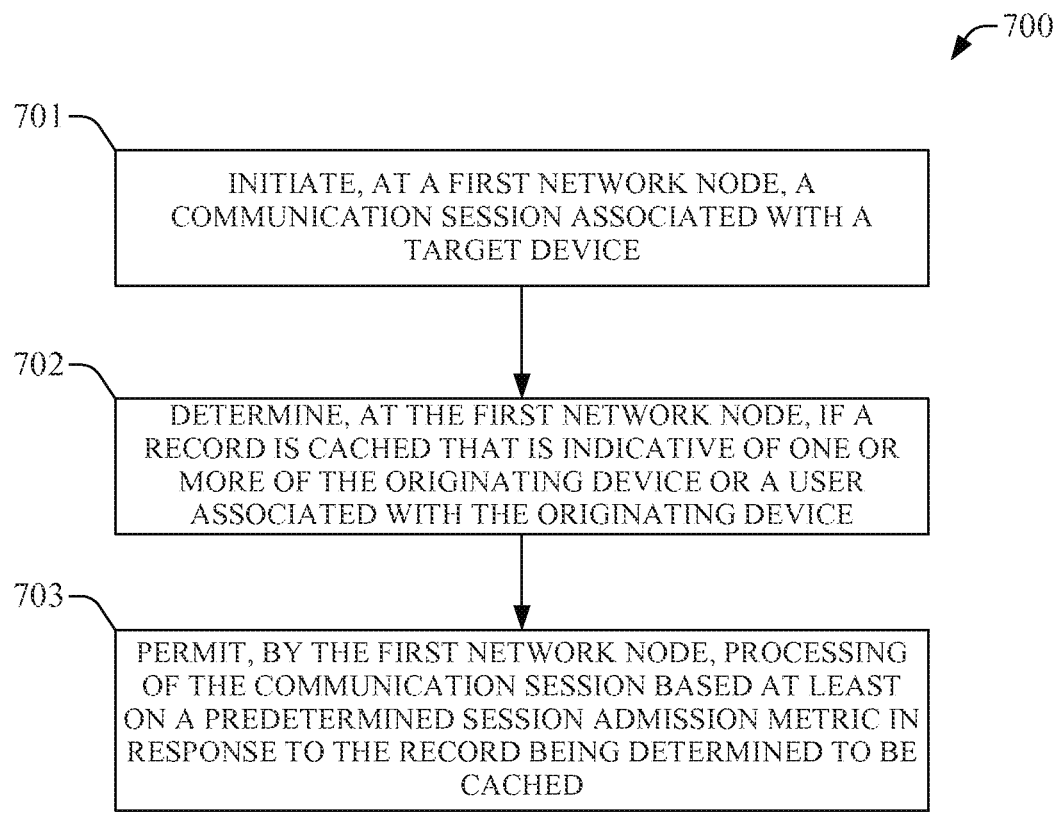
FIG. 7 is a flow chart that illustrates another exemplary method in accordance with one or more aspects of the disclosure.

In another aspect, illustrated in FIG. 7, provided are methods 700 comprising initiating, at a first network node, a communication session associated with a target device at 701, determining, at the first network node, if a record is cached that is indicative of one or more of the originating device or a user associated with the originating device at 702, and processing, by the first network node, the communication session based at least on a predetermined session admission metric in response to the record being determined to be cached at 703.

The methods can further comprise processing the communication session in response to the record being determined to not be cached. The methods can further comprise processing the communication session in response to processing of the communication session, wherein the communication session is one of an automated interactive multimedia session, a non-automated interactive multimedia session, a hybrid interactive multimedia session, or an interactive voice session.

In an aspect, processing, by the first network node, the communication session based at least on a predetermined session admission metric in response to the record being determined to be cached can comprise configuring the communication session for processing. The methods can further comprise monitoring a session establishment performance metric prior to determining, at the first network node, if a record is cached that is indicative of one or more of the originating device or a user associated with the originating device and proceeding to make said determination in response to the session establishment performance metric being substantially equal to or greater than a configurable threshold.

In another aspect, determining, at the first network node, if a record is cached that is indicative of one or more of the originating device or a user associated with the originating device can be implemented during a configurable admission control interval. The configurable admission control interval can range from about 1 second to about 1 hour.

One or more embodiments of the subject disclosure can employ artificial intelligence (AI) techniques such as machine learning and iterative learning. Examples of such techniques include, but are not limited to, expert systems, case based reasoning, Bayesian networks, adaptive feedback filters, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method comprising:
   receiving, from an originating device, a request for an identifier of the originating device to be stored in an admission control cache of legitimate originating devices, wherein the request comprises the identifier of the originating device and at least one proposed session admission criteria;
   determining whether the originating device is a legitimate originating device based on the at least one proposed session admission criteria;
   storing the identifier of the originating device in the admission control cache of legitimate originating devices if the originating device is determined to be a legitimate originating device; and
   processing a communication request, from the originating device to a target device, based on the identifier of the originating device being stored in the admission control cache of legitimate originating devices and based on a session admission metric derived from the at least one proposed session criteria being satisfied.

2. The method of claim 1, further comprising determining whether the originating device is a legitimate originating device based on an admission control cache of illegitimate originating devices.

3. The method of claim 2, further comprising storing the identifier of the originating device in the admission control cache of illegitimate originating devices if the originating device is determined to be an illegitimate originating device.

4. The method of claim 1, wherein storing the identifier of the originating device in the admission control cache of legitimate originating devices if the originating device is determined to be a legitimate originating device comprises associating a session admission metric derived from the at least one proposed session admission criteria with the identifier of the originating device.

5. The method of claim 4, wherein the at least one session admission criteria is used to initiate or reject a communication session between the originating device and the target device.

6. The method of claim 1, further comprising, storing the identifier of the originating device in an admission control cache of illegitimate originating devices if a threshold of invalid communications to a destination number is satisfied.

7. A method comprising:
   receiving, by a computing device, an incoming communication from an originating device to a target device, wherein the incoming communication from the originating device comprises an identifier of the originating device and an identifier of the target device;
   determining whether a record is cached based on the identifier of the originating device;
   determining whether the record indicates that a call threshold has been exceeded for the originating device;
   in response to determining the call threshold has been exceeded for the originating device and the record is cached, determining whether the record indicates the originating device to be an illegitimate originating device; and rejecting the incoming communication if the record indicates the originating device to be an illegitimate originating device.

8. The method of claim 7, further comprising:

in response to determining that the record indicates the originating device is not an illegitimate originating device, determining whether the record indicates that the originating device is a legitimate originating device;

in response to determining the originating device is a legitimate originating device, determining whether the identifier of the target device is cached as a target device that is to receive the incoming communication; and processing the incoming communication if the identifier of the target device is cached as the target device that is to receive the incoming communication.

9. The method of claim 8, further comprising:

recording the identifier of the originating device as an illegitimate originating device if the record indicates the originating device is not a legitimate originating device; and rejecting the incoming communication.

10. The method of claim 8, further comprising, rejecting the incoming communication if the target device is determined not to receive the incoming communication.

11. The method of claim 8, wherein processing the incoming communication if the target device is determined to receive the incoming communication comprises:

determining whether the identifier of the target device is a valid identifier;

in response to determining the identifier of the target device is not valid identifier, updating the record based on the identifier of the originating device with negative information; and rejecting the incoming communication.

12. The method of claim 11, wherein processing the incoming communication if the target device is determined to receive the incoming communication comprises:

determining whether a threshold of negative information is associated with the record based on the identifier of the originating device; and updating the record based on the identifier of the originating device that the originating device is an illegitimate originating device if the record indicates the threshold of negative information has been satisfied.

13. The method of claim 7, further comprising in response to determining the record is not cached based on the identifier of the originating device, processing the incoming communication from the originating device.

14. The method of claim 13, wherein processing the incoming communication from the originating device comprises:

determining whether the identifier of the target device is a valid identifier;

in response to determining the identifier of the target device is not a valid identifier, generating a record based on the identifier of the originating device with negative information; and rejecting the incoming communication.

15. The method of claim 14, wherein processing the incoming communication from the originating device comprises:

determining whether a threshold of negative information is associated with the record based on the identifier of the originating device; and updating the record based on the identifier of the originating device that the originating device is an illegitimate originating device if the record indicates the threshold of negative information has been satisfied.

16. An apparatus, comprising:

a memory, configured for storing a registry; and a processor, coupled to the memory, wherein the processor is configured to, initiate a communication session between an originating device and a target device, determine whether a record is cached that is indicative of one or more of the originating device or a user associated with the originating device, process the communication session based at least on a predetermined session admission metric in response to the record being determined to be cached, and process the communication session in response to the record being determined to not be cached.

17. The apparatus of claim 16, wherein the communication session is one of an automated interactive multimedia session, a non-automated interactive multimedia session, a hybrid interactive multimedia session, or an interactive voice session.

18. The apparatus of claim 16, wherein the processor is further configured to configure the communication session for processing.

19. The apparatus of claim 16, wherein the processor is further configured to:

monitor a session establishment performance metric prior to determining whether the record is cached that is indicative of one or more of the originating device or the user associated with the originating device; and determine whether the record is cached that is indicative of one or more of the originating device or the user associated with the originating device in response to the session establishment performance metric being substantially equal to or greater than a configurable threshold.

20. The apparatus of claim 16, wherein the processor is further configured to determine whether the record is cached that is indicative of one or more of the originating device or the user associated with the originating device during a configurable admission control interval.

* * * * *